(12) United States Patent
Ikazaki et al.

(10) Patent No.: US 10,795,621 B2
(45) Date of Patent: Oct. 6, 2020

(54) IMAGE FORMING APPARATUS DETECTS HUMAN BODY TO LIFT SUSPENSION ON PRINTING PROCESS FOR EXECUTING A PRINT JOB

(71) Applicant: KYOCERA Document Solutions Inc., Osaka (JP)

(72) Inventors: Akihiko Ikazaki, Osaka (JP); Shuntaro Tsuji, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/391,886

(22) Filed: Apr. 23, 2019

(65) Prior Publication Data

US 2019/0332338 A1 Oct. 31, 2019

(30) Foreign Application Priority Data

Apr. 27, 2018 (JP) .................................. 2018-087178

(51) Int. Cl.
| | | |
|---|---|---|
| *H04N 1/00* | (2006.01) | |
| *G06F 3/12* | (2006.01) | |
| *H04L 29/06* | (2006.01) | |
| *G06F 21/31* | (2013.01) | |
| *H04N 1/44* | (2006.01) | |

(52) U.S. Cl.
CPC ............ *G06F 3/1237* (2013.01); *G06F 3/122* (2013.01); *H04N 1/0044* (2013.01); *G06F 21/31* (2013.01); *H04L 63/10* (2013.01); *H04N 1/442* (2013.01); *H04N 2201/0094* (2013.01)

(58) Field of Classification Search
None
See application file for complete search history.

(56) References Cited

U.S. PATENT DOCUMENTS

2007/0177185 A1* 8/2007 Ogura .................... G06F 3/1208
358/1.14
2015/0062612 A1* 3/2015 Nishii .................... G06F 3/1222
358/1.14

FOREIGN PATENT DOCUMENTS

JP H05-323735 A 12/1993

* cited by examiner

*Primary Examiner* — Benny Q Tieu
*Assistant Examiner* — Haris Sabah
(74) *Attorney, Agent, or Firm* — IP Business Solutions, LLC

(57) ABSTRACT

An image forming apparatus includes an image forming section, a sheet output tray, an operating section, an operation acceptance section, a human body detection sensor, a communication section, a command acceptance section, and a control section. When the command acceptance section accepts a print job command from an external device while a human body is being detected by the human body detection sensor provided at the front of the image forming apparatus, the control section suspends a print job based on the print job command.

9 Claims, 7 Drawing Sheets

Fig.4

| DISPLAYED SCREEN | | USB MEMORY | |
|---|---|---|---|
| | | CONNECTED | NOT CONNECTED |
| | COPY SCREEN PRINT SCREEN | CALL ATTENTION | CALL ATTENTION |
| | OTHER THAN LISTED ABOVE | CALL ATTENTION | NOT CALL ATTENTION |

| DISPLAYED SCREEN | | USB MEMORY | | |
|---|---|---|---|---|
| | | CONNECTED | | NOT CONNECTED |
| | | DATA TYPE IN USB MEMORY | | |
| | | PDF, TIFF, JPEG, XPS | OTHER THAN LISTED IN THE LEFT COLUMN | |
| | COPY SCREEN PRINT SCREEN | CALL ATTENTION | CALL ATTENTION | CALL ATTENTION |
| | OTHER THAN LISTED ABOVE | CALL ATTENTION | NOT CALL ATTENTION | NOT CALL ATTENTION |

T2

IMAGE FORMING APPARATUS DETECTS HUMAN BODY TO LIFT SUSPENSION ON PRINTING PROCESS FOR EXECUTING A PRINT JOB

INCORPORATION BY REFERENCE

This application claims priority to Japanese Patent Application No. 2018-087178 filed on Apr. 27, 2018, the entire contents of which are incorporated by reference herein.

BACKGROUND

The present disclosure relates to image forming apparatuses and particularly relates to a technique in executing a print job command sent from an external device.

In relation to a duplicator (copier), there is known a technique in which if a transfer sheet (print) is left on a sheet output tray when the signal from a human body detection sensor for detecting the presence of a human body in front of the duplicator changes from ON to OFF and the sensor thus detects that an operator is about to move away from the front of the duplicator, the operator is notified of the presence of the transfer sheet left on the sheet output tray using a buzzer or the like.

SUMMARY

A technique improved over the aforementioned technique is proposed as one aspect of the present disclosure.

An image forming apparatus according to an aspect of the present disclosure includes an image forming section, a sheet output tray, an operating section, a human body detection sensor, a communication section, and a control unit. The image forming section forms an image on a recording medium. The sheet output tray is a tray onto which the recording medium having the image formed by the image forming section is discharged. The operating section is a section through which an instruction is input from a user. The human body detection sensor is provided in the image forming apparatus and detects a human body present in front of the image forming apparatus. The communication section communicates data with an external device. The control unit includes a processor. When the processor executes a control program, the control unit functions as an operation acceptance section, a command acceptance section, and a control section. The operation acceptance section accepts the instruction input through the operating section. The command acceptance section accepts a print job command from the external device through the communication section. The control section controls an operation of the image forming section to execute, upon acceptance of a print job instruction by the operation acceptance section, a print job based on the print job instruction, and execute, upon acceptance of the print job command from the external device by the command acceptance section, a print job based on the print job command. Furthermore, when the command acceptance section accepts the print job command while a human body is being detected by the human body detection sensor, the control section performs a suspension of the print job based on the print job command.

BRIEF DESCRIPTION OF THE DRAWINGS

FIG. 4 is an example of a table in which determinations on whether or not to call attention are divided into cases.

FIG. 7 is an example of a table in which determinations on whether or not to call attention are divided into cases.

DETAILED DESCRIPTION

Figure 1:
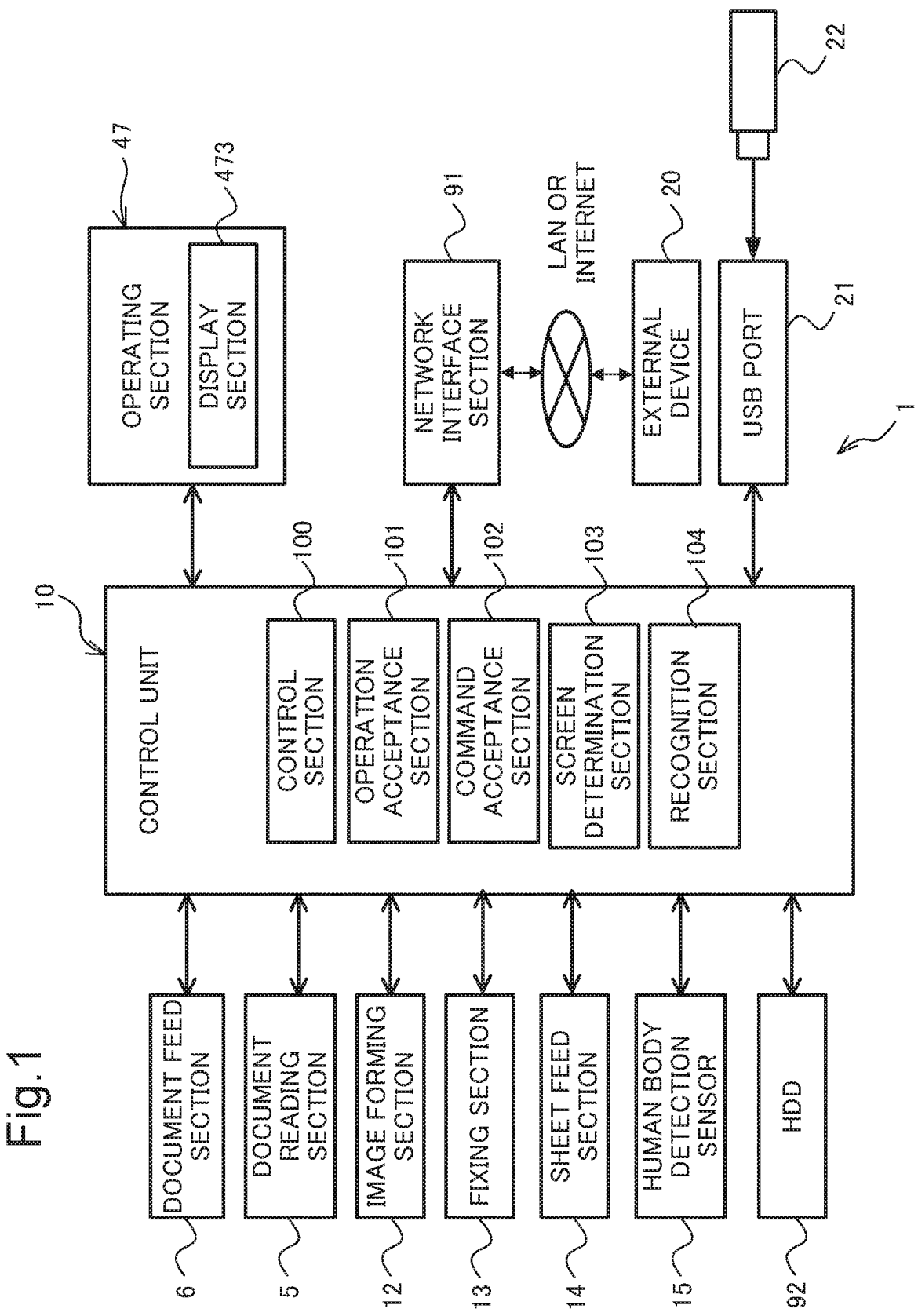
FIG. 1 is a functional block diagram schematically showing an essential internal configuration of an image forming apparatus according to a first embodiment of the present disclosure.

Hereinafter, a description will be given of image forming apparatuses according to embodiments of the present disclosure with reference to the drawings. FIG. 1 is a functional block diagram schematically showing an essential internal configuration of an image forming apparatus according to a first embodiment of the present disclosure.

An image forming apparatus 1 is, for example, a multi-function peripheral having multiple functions including a copy function, a print function, a scan function, and a facsimile function. The image forming apparatus 1 includes a control unit 10, a document feed section 6, a document reading section 5, an image forming section 12, a fixing section 13, a sheet feed section 14, a human body detection sensor 15, an operating section 47, a network interface section 91, and a USB (universal serial bus) port 21.

First, a description will be given of the case where a document reading operation is performed on the image forming apparatus 1. The document reading section 5 optically reads an image of an original document being conveyed by the document feed section 6 or an image of an original document put on an unshown original glass plate and generates image data from the read image. The image data generated by the document reading section 5 is stored in an unshown image memory or the like.

Next, a description will be given of the case where an image forming operation is performed on the image forming apparatus 1. Based on the image data generated by the document reading operation or image data received from a personal computer or the like serving as an external device 20 connected via a network, the image forming section 12 forms a toner image on a recording paper sheet serving as a recording medium fed from the sheet feed section 14.

The fixing section 13 fixes the toner image on the recording paper sheet by application of heat and pressure. The recording paper sheet (print) subjected to the fixation processing is discharged onto an unshown sheet output tray. The sheet feed section 14 includes at least one sheet feed cassette.

The human body detection sensor 15 is a sensor provided in the image forming apparatus 1 to detect the presence of a human in front of the image forming apparatus 1. As the human body detection sensor 15, a pyroelectric infrared sensor including a pyroelectric element capable of detecting the amount of change of infrared rays from a human body is used. For example, the human body detection sensor 15 is provided at the front of the image forming apparatus 1.

The operating section 47 is a section through which operator's instructions for various types of operations and processing executable by the image forming apparatus 1, such as an instruction to execute an image forming operation, are input. The operating section 47 includes a display section 473 that displays operation guidance and other types of information for the operator. The display section 473 is formed of a touch panel, through which the operator can touch buttons and keys displayed on the screen to operate the image forming apparatus 1.

The network interface section 91 transfers various types of data to and from external devices 20, such as personal computers and servers, on a local area network or on the Internet. The network interface section 91 is an example of a communication section defined in "What is claimed is".

The USB port 21 is an interface connectable to a USB memory 22 serving as an external memory. The USB port 21 is an example of a connecting section defined in "What is claimed is".

The control unit 10 is made up by including a processor, a RAM (random access memory), a ROM (read only memory), and a dedicated hardware circuit. The processor is, for example, a CPU (central processing unit), an ASIC (application specific integrated circuit) or an MPU (microprocessing unit). The control unit 10 includes a control section 100, an operation acceptance section 101, a command acceptance section 102, a screen determination section 103, and a recognition section 104.

When the above processor operates in accordance with a control program stored on an HDD (hard disk drive) 92, the control unit 10 functions as the control section 100, the operation acceptance section 101, the command acceptance section 102, the screen determination section 103, and the recognition section 104. Alternatively, each of the control section 100 and the other sections may not be implemented by the operation of the processor in accordance with the control program but may be constituted by a hardware circuit. Hereinafter, the same applies to the other embodiments unless otherwise stated.

The control section 100 governs the overall operation control of the image forming apparatus 1. The control section 100 is connected to the document feed section 6, the document reading section 5, the image forming section 12, the fixing section 13, the sheet feed section 14, the human body detection sensor 15, the operating section 47, the network interface section 91, and the USB port 21 and controls the operations of these components.

The operation acceptance section 101 accepts an input of an instruction from a user through the operating section 47. For example, when the operation acceptance section 101 accepts a user's print job instruction to execute a print job (for example, copying or printing), the control section 100 controls the operation of the image forming section 12 to execute the print job based on the print job instruction accepted by the operation acceptance section 101.

The command acceptance section 102 accepts various types of commands from external devices 20 through the network interface section 91. For example, when the command acceptance section 102 accepts a print job command to execute a print job from an external device 20, the control section 100 controls the operation of the image forming section 12 to execute the print job based on the print job command accepted by the command acceptance section 102.

The screen determination section 103 determines whether or not a screen that the control section 100 allows the display section 473 to be displaying is a predetermined operation screen for use in being instructed to execute a print job by the user. Examples of an operation screen to be displayed on the display section 473 include a copy screen, a print screen, a scan screen, and a facsimile screen, while examples of the predetermined operation screen include the copy screen and the print screen.

The recognition section 104 recognizes the connection of a USB memory 22 to the USB port 21. An example of a method for recognizing the connection of a USB memory 22 to the USB port 21 is a method using the Plug and Play function.

Figure 2:
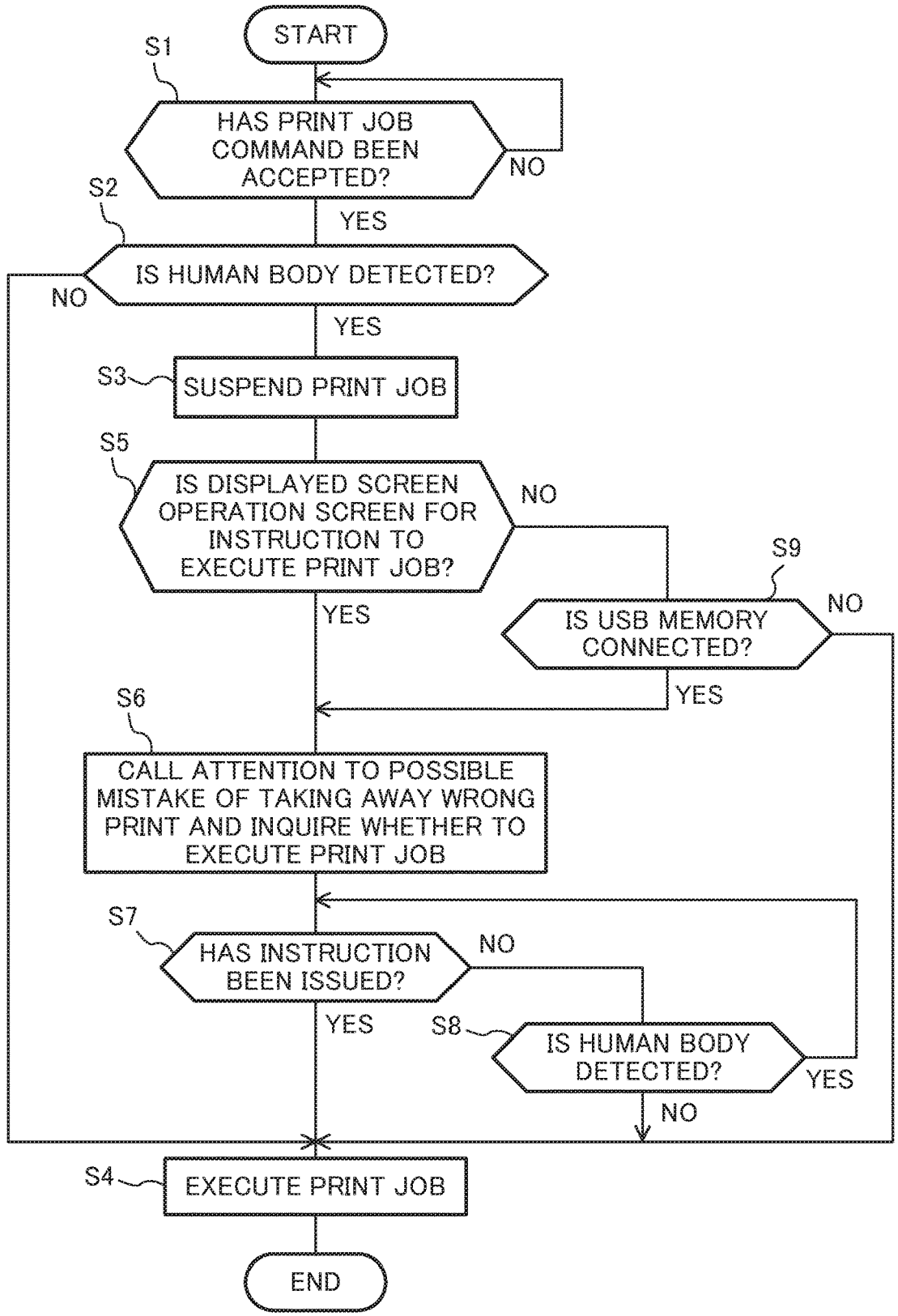
FIG. 2 is a flowchart showing an example of a processing operation performed by a control unit of the image forming apparatus according to the first embodiment.

Next, a description will be given of an example of a processing operation performed by the control unit 10 of the image forming apparatus 1 according to the first embodiment, with reference to a flowchart shown in FIG. 2. When the command acceptance section 102 accepts a print job command from an external device 20 (YES in S1), the control section 100 determines whether or not a human body is being detected by the human body detection sensor 15 (S2).

When determining that a human body is being detected by the human body detection sensor 15 (i.e., a user A is present in front of the image forming apparatus 1) (YES in S2), the control section 100 performs a suspension of a print job based on the print job command from the external device 20 (the print job command from a user B different from the user A) (S3).

When a print based on the print job command from the user B different from the user A present in front of the image forming apparatus 1 is discharged onto the sheet output tray of the image forming apparatus 1, the user A may take away the print by mistake. For this reason, the print job based on the print job command from the user B is suspended.

On the other hand, if the control section 100 determines that no human body is being detected by the human body detection sensor 15 (NO in S2), it can be considered that the possibility of occurrence of taking away of a wrong print is low. Therefore, the control section 100 controls the operation of the image forming section 12 to execute the print job based on the print job command from the external device 20 (S4) and ends this processing.

After the control section 100 suspends the print job based on the print job command from the external device 20 in S3, the screen determination section 103 determines whether or not the screen being displayed on the display section 473 is the predetermined operation screen for use in being instructed to execute a print job by the user (in this case, a screen on which the user A in front of the image forming apparatus 1 is highly likely to input an instruction to execute a print job, such as a copy screen or a print screen) (S5).

When the screen determination section 103 determines that the screen being displayed on the display section 473 is the predetermined operation screen (a copy screen, a print screen or the like) (YES in S5), the user A present in front of the image forming apparatus 1 is highly likely to give an instruction to execute a print job and, therefore, a mistake of taking away a wrong print is highly likely to occur. Hence, the control section 100 controls the operation of the display section 473 to allow the display section 473 to provide a display for calling attention to the possibility of mistakenly taking away a recording medium (print) discharged onto the sheet output tray and also provide a display for inquiring of the user whether to execute the print job based on the print job command from the external device 20 (S6).

Figure 3:
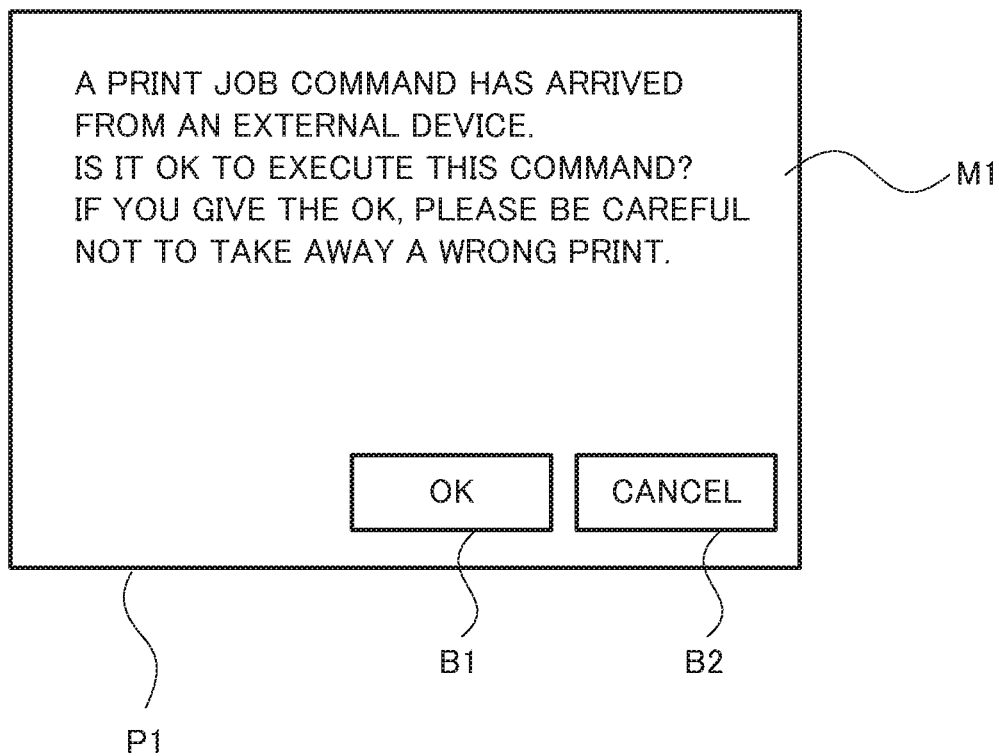
FIG. 3 is a view showing an example of an operation screen displayed on a display section.

For example, the control section 100 allows the display section 473 to display such an operation screen P1 as shown in FIG. 3, thus calling attention to a possible mistake of taking away a wrong print and confirming with the user whether to give an instruction to execute the print job based on the print job command from the external device 20.

The operation screen P1 is made up by including, for example, a message M1 "A print job command has arrived from an external device. Is it OK to execute this command? If you give the OK, please be careful not to take away a wrong print.", a select button B1 shown as "OK", and a select button B2 shown as "Cancel".

Subsequently, the control section 100 determines whether or not the operation acceptance section 101 has accepted an instruction to execute the print job based on the print job command from the external device 20 (S7). Specifically, when the operation acceptance section 101 accepts through the touch panel a user's operation made on the select button B1 on the operation screen P1, the control section 100 determines that the operation acceptance section 101 has accepted the above instruction to execute the print job.

When determining that the operation acceptance section 101 has accepted an instruction to execute the print job (YES in S7), the control section 100 lifts the suspension and controls the operation of the image forming section 12 to execute the print job based on the print job command from the external device 20 (S4). Then, the processing ends.

On the other hand, when determining that the operation acceptance section 101 has not accepted an instruction to execute the print job (NO in S7), the control section 100 determines again whether or not a human body is being detected by the human body detection sensor 15 (S8).

If at this time the control section 100 determines that no human body is being detected by the human body detection sensor 15 (the user A has moved away from the front of the image forming apparatus 1) (NO in S8), a print is less likely to be taken away by mistake. Therefore, the control section 100 lifts the suspension and executes the print job based on the print job command from the external device 20 (S4). Then, the processing ends.

On the other hand, when the control section 100 determines that a human body is being detected by the human body detection sensor 15 (the user A is present in front of the image forming apparatus 1) (YES in S8), the processing goes back to S7.

When in S5 the screen determination section 103 determines that the screen being displayed on the display section 473 is not the predetermined operation screen (a copy screen or a print screen) (NO in S5), the control section 100 determines whether or not the recognition section 104 has recognized the connection of a USB memory 22 to the USB port 21 (S9).

When the control section 100 determines that the recognition section 104 has recognized the connection of a USB memory 22 to the USB port 21 (YES in S9), it is expected that the user A in front of the image forming apparatus 1 will give an instruction to execute a print job on data stored in the USB memory 22, which means a high possibility of occurrence of taking away of a wrong print. Therefore, the control section 100 provides the above display for calling attention and the display for inquiring of the user whether to execute the print job based on the print job command from the external device 20 (S6).

On the other hand, when the control section 100 determines that the recognition section 104 has not recognized the connection of a USB memory 22 to the USB port 21 (NO in S9), it can be considered that the possibility of occurrence of taking away of a wrong print is low. Therefore, the control section 100 lifts the above suspension, executes the print job based on the print job command from the external device 20 (S4), and ends this processing.

FIG. 4 is an example of a table in which determinations on whether or not to call attention to a possible mistake of taking away a wrong print when the command acceptance section 102 accepts a print job command during detection of a human body by the human body detection sensor 15 are divided into cases.

The table T1 shown in FIG. 4 shows that when the command acceptance section 102 accepts a print job command during detection of a human body by the human body detection sensor 15, attention is called to a possible mistake of taking away a wrong print if the screen being displayed on the display section 473 is a copy screen or a print screen.

Also, the table T1 shows that when the screen being displayed on the display section 473 is other than the copy screen and the print screen (for example, the displayed screen is a scan screen or a facsimile screen), attention is called to the possible mistake if a USB memory 22 is connected to the USB port 21, but attention is not called to the possible mistake if no USB memory 22 is connected thereto.

According to the above first embodiment, when during detection of a human body by the human body detection sensor 15 (in the presence of the user A in front of the image forming apparatus 1) a print job command from an external device 20 (a print job command from another user B) has been accepted and the screen being displayed on the display section 473 is a copy screen or a print screen, a print job based on the print job command is suspended. Furthermore, a display for calling attention to a possible mistake of taking away a wrong print is provided.

Moreover, so long as a USB memory 22 is connected to the USB port 21 even if the screen being displayed on the display section 473 is other than the copy screen and the print screen, the above display for calling attention is provided and the print job based on the print job command is suspended.

Therefore, if a print discharged onto the sheet output tray is highly likely to be taken away by mistake, user's attention is called to the possible mistake and, in addition, the discharge of a print based on the print job command from the external device 20 can be stopped. Hence, the print discharged onto the sheet output tray can be prevented from being taken away by mistake.

A general image forming apparatus, such as a multifunction peripheral, has the function of accepting, not only a user's print job instruction through an operating section provided on the apparatus body, but also a print job command from an external device (for example, a personal computer) to execute the print job according to the command. Therefore, it is conceivable that there occurs an event that, while one user A is operating the operating section provided on the apparatus body, the image forming apparatus accepts a print job command of another user B transmitted from an external device and the user A then instructs the image forming apparatus to execute his/her print job. If, in the case where the above event has occurred, the user A does not become aware of the print job command from the external device, the user A may mistakenly perceive a print discharged onto the sheet output tray (a print based on the print job command from the user B) as a print based on his/her own print job instruction and take away the wrong print. Unlike the above general image forming apparatus, the image forming apparatus 1 according to this embodiment can prevent the print discharged onto the sheet output tray from being taken away by mistake.

In the above first embodiment, when the command acceptance section 102 accepts a print job command while a human body is being detected by the human body detection sensor 15, whether to call attention to the above possible mistake is determined depending upon the contents of the screen being displayed on the display section 473. However, in another embodiment, when the command acceptance section 102 accepts a print job command while a human body is being detected by the human body detection sensor 15, the control section 100 may suspend a print job based on the print job command regardless of the contents of the screen being displayed on the display section 473. In this case, the control section 100 may call attention to the possible mistake and concurrently suspend the print job based on the print job command.

Figure 5:
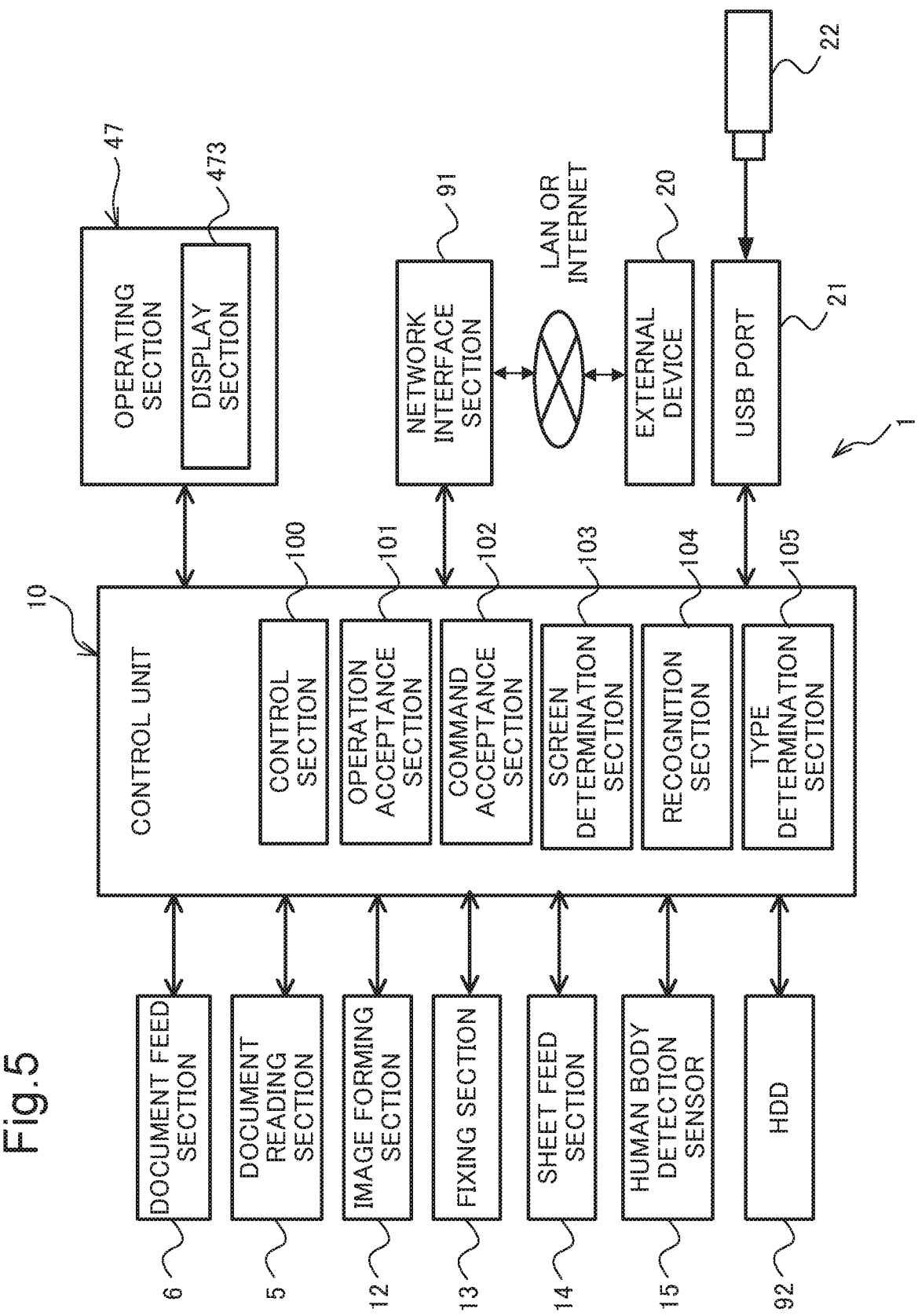
FIG. 5 is a functional block diagram schematically showing an essential internal configuration of an image forming apparatus according to a second embodiment of the present disclosure.

FIG. 5 is a functional block diagram schematically showing an essential internal configuration of an image forming apparatus according to a second embodiment. The image forming apparatus 1 according to the second embodiment is different, from the image forming apparatus 1 according to the first embodiment shown in FIG. 1, in that the control unit 10 further includes a type determination section 105.

The type determination section 105 determines whether or not a predetermined type of data printable on the image forming apparatus 1 is stored in a USB memory 22 connected to the USB port 21. The predetermined type of data is a type of data from which an image can be formed by the image forming section 12 under the control of the control section 100 on the image forming apparatus 1. For example, in the case where the HDD 92 stores respective applications compatible with PDF, TIFF, JPEG and XPS and the control section 100 has the capability to allow the image forming section 12 to form images of PDF, TIFF, JPEG and XPS data using the above applications, PDF, TIFF, JPEG and XPS are examples of the predetermined type of data. The type determination section 105 determines the type of data, for example, from the extension of a file containing the data.

Figure 6:
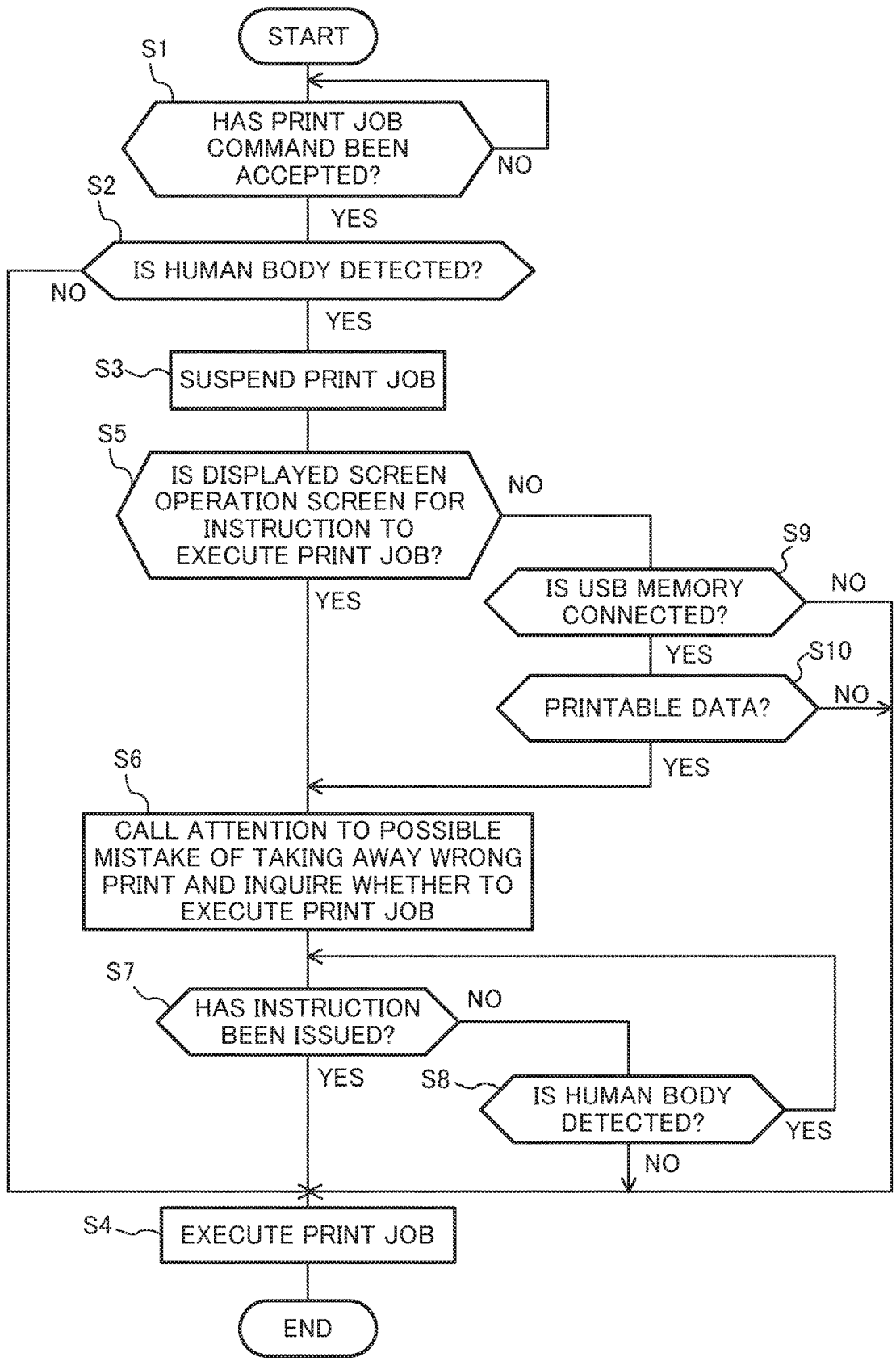
FIG. 6 is a flowchart showing an example of a processing operation performed by a control unit of the image forming apparatus according to the second embodiment.

Next, a description will be given of an example of a processing operation performed by the control unit 10 of the image forming apparatus 1 according to the second embodiment, with reference to a flowchart shown in FIG. 6. Since the flowchart shown in FIG. 6 is the same as the flowchart shown in FIG. 1 except for S10, the following description of the processing operation will start with S9.

In S9, the control section 100 determines whether or not the recognition section 104 has recognized the connection of a USB memory 22 to the USB port 21 (S9). When the control section 100 determines that the recognition section 104 has recognized the connection of a USB memory 22 to the USB port 21 (YES in S9), the type determination section 105 determines whether or not the predetermined type or types of data (PDF, TIFF, JPEG or XPS in this embodiment) printable on the image forming apparatus 1 are stored in the USB memory 22 connected to the USB port 21 (S10).

Specifically, the type determination section 105 reads out data on a list of files stored in the USB memory 22, identifies the types of data stored in the files from the extensions affixed to the ends of the file names, and determines whether or not the predetermined type or types of data are stored in the USB memory 22.

When the type determination section 105 determines that the predetermined type or types of data are stored in the USB memory 22 (YES in S10), it is expected that the user A in front of the image forming apparatus 1 will give an instruction to execute a print job on data stored in the USB memory 22, which means a high possibility of occurrence of taking away of a wrong print. Therefore, the control section 100 controls the operation of the display section 473 to allow the display section 473 to provide a display for calling attention to a possible mistake of taking away a wrong print and a display for inquiring of the user whether to execute the print job based on the print job command from the external device 20 (S6). In other words, only when the screen determination section 103 determines that the screen being displayed on the display section 473 is not the predetermined operation screen, the recognition section 104 recognizes the connection of a USB memory 22 to the USB port 21, and the type determination section 105 determines that the predetermined type or types of data are stored in the USB memory 22, the control section 100 allows the display section 473 to provide a display for calling attention to the possible mistake and keeps suspending the print job based on the print job command.

On the other hand, when the type determination section 105 determines that the predetermined type or types of data are not stored in the USB memory 22 (NO in S10), no instruction will be issued to execute a print job on data stored in the USB memory 22 and a print is less likely to be taken away by mistake. Therefore, the control section 100 controls the operation of the image forming section 12 to execute the print job based on the print job command from the external device 20 (S4). In other words, when the screen determination section 103 determines that the screen being displayed on the display section 473 is not the predetermined operation screen, the recognition section 104 recognizes the connection of a USB memory 22 to the USB port 21, and the type determination section 105 determines that the predetermined type or types of data are not stored in the USB memory 22, the control section 100 allows the display section 473 not to provide a display for calling attention to the possible mistake and executes the suspended print job based on the print job command.

FIG. 7 is an example of a table in which determinations on whether or not to call attention to a possible mistake of taking away a wrong print when the command acceptance section 102 accepts a print job command during detection of a human body by the human body detection sensor 15 are divided into cases.

The table T2 shown in FIG. 7 shows that when the command acceptance section 102 accepts a print job command during detection of a human body by the human body detection sensor 15, attention is called to a possible mistake of taking away a wrong print if the screen being displayed on the display section 473 is a copy screen or a print screen.

Also, the table T2 shows that when the screen being displayed on the display section 473 is other than the copy screen and the print screen, attention is called to the possible mistake if the USB memory 22 connected to the USB port 21 stores printable data, such as PDF, attention is not called to the possible mistake if the USB memory 22 does not store printable data, such as PDF, and attention is not called to the possible mistake if no USB memory 22 is connected to the USB port 21.

According to the second embodiment, if a USB memory 22 is connected to the USB port 21 but data stored in the USB memory 22 is not printable data, attention is not called to the possible mistake. Therefore, it can be avoided that attention is called to the possible mistake more than necessary, and the productivity can be thus increased.

The present disclosure is not limited to the above embodiments and can be modified in various ways. Although the description of the above embodiments is given taking a multifunction peripheral as an example of the image forming apparatus according to the present disclosure, the example is merely illustrative and the image forming apparatus may be, for example, any other image forming apparatus having a print function.

The structures and processing shown in the above embodiments with reference to FIGS. 1 to 7 are merely illustrative of the present disclosure and not intended to limit the present disclosure to the above particular structures and processing.

While the present disclosure has been described in detail with reference to the embodiments thereof, it would be apparent to those skilled in the art the various changes and modifications may be made therein within the scope defined by the appended claims.

What is claimed is:

1. An image forming section that forms an image on a recording medium;
   a sheet output tray onto which the recording medium having the image formed by the image forming section is discharged;
   an operating section through which an instruction is input from a user;
   a human body detection sensor that is provided in the image forming apparatus and detects a human body present in front of the image forming apparatus;
   a communication section that communicates data with an external device;
   a display section; and
   a control unit including a processor,
   wherein when the processor executes a control program, the control unit functions as:
   an operation acceptance section that accepts the instruction input through the operating section;
   a command acceptance section that accepts a print job command from the external device through the communication section; and
   a control section that controls an operation of the image forming section to execute, upon acceptance of a print job instruction by the operation acceptance section, a print job based on the print job instruction, and execute, upon acceptance of the print job command from the external device by the command acceptance section, a print job based on the print job command, and
   when the command acceptance section accepts the print job command while the human body is being detected by the human body detection sensor, the control section performs a suspension of the print job based on the print job command and allows the display section to provide a display for calling attention to a possible mistake of taking away a wrong recording medium discharged onto the sheet output tray.

2. The image forming apparatus according to claim 1, wherein when the control section allows the display section to provide the display for calling attention to the possible mistake and a display for inquiring of the user whether to execute the print job based on the print job command from the external device and then the operation acceptance section accepts an instruction to execute the print job based on the print job command from the user, the control section lifts the suspension and executes the print job based on the print job command from the external device.

3. The image forming apparatus according to claim 1, wherein when the control section allows the display section to provide the display for calling attention to the possible mistake and a display for inquiring of the user whether to execute the print job based on the print job command from the external device and then the human body becomes undetectable by the human body detection sensor even if the operation acceptance section has not accepted an instruction to execute the print job based on the print job command from the user, the control section lifts the suspension and executes the print job based on the print job command from the external device.

4. The image forming apparatus according to claim 1, wherein
   when the control program is executed, the control unit further functions as a screen determination section that determines whether or not a screen being displayed on the display section is a predetermined operation screen for use in being instructed to execute a print job by the user,
   when the screen determination section determines that the screen being displayed on the display section is the predetermined operation screen, the control section suspends the print job based on the print job command and allows the display section to provide the display for calling attention to the possible mistake, and
   when the screen determination section determines that the screen being displayed on the display section is not the predetermined operation screen, the control section allows the display section not to provide the display for calling attention to the possible mistake and executes the suspended print job based on the print job command.

5. The image forming apparatus according to claim 4, further comprising a connecting section connectable to an external memory,
   wherein when the control program is executed, the control unit further functions as a recognition section that recognizes connection of the external memory to the connecting section, and
   when the screen determination section determines that the screen being displayed on the display section is not the predetermined operation screen and the recognition section has no recognition of the connection of the external memory to the connection section, the control section allows the display section not to provide the display for calling attention to the possible mistake and executes the suspended print job based on the print job command.

6. The image forming apparatus according to claim 5, wherein when the screen determination section determines that the screen being displayed on the display section is not the predetermined operation screen and the recognition section recognizes the connection of the external memory to the connection section, the control section allows the display section to provide the display for calling attention to the possible mistake and keeps suspending the print job based on the print job command.

7. The image forming apparatus according to claim 6, wherein
   when the control program is executed, the control section further functions as a type determination section that determines whether or not a predetermined type of data printable on the image forming apparatus is stored in the external memory connected to the connecting section, and
   only when the screen determination section determines that the screen being displayed on the display section is not the predetermined operation screen, the recognition section recognizes the connection of the external memory to the connecting section, and the type determination section determines that the predetermined type of data is stored in the external memory, the control section allows the display section to provide the display for calling attention to the possible mistake and keeps suspending the print job based on the print job command.

8. The image forming apparatus according to claim 7, wherein when the screen determination section determines that the screen being displayed on the display section is not the predetermined operation screen, the recognition section recognizes the connection of the external memory to the connection section, and the type determination section determines that the predetermined type of data is not stored in the external memory, the control section allows the display section not to provide the display for calling attention to the possible mistake and executes the suspended print job based on the print job command.

9. An image forming apparatus comprising:
   an image forming section that forms an image on a recording medium;
   a sheet output tray onto which the recording medium having the image formed by the image forming section is discharged;
   an operating section through which an instruction is input from a user;
   a human body detection sensor that is provided in the image forming apparatus and detects a human body present in front of the image forming apparatus;
   a communication section that communicates data with an external device; and
   a control unit including a processor,
   wherein when the processor executes a control program, the control unit functions as:
   an operation acceptance section that accepts the instruction input through the operating section;
   a command acceptance section that accepts a print job command from the external device through the communication section; and
   a control section that controls an operation of the image forming section to execute, upon acceptance of a print job instruction by the operation acceptance section, a print job based on the print job instruction, and execute, upon acceptance of the print job command from the external device by the command acceptance section, a print job based on the print job command,
   when the command acceptance section accepts the print job command while the human body is being detected by the human body detection sensor, the control section performs a suspension of the print job based on the print job command, and
   when the human body becomes undetectable by the human body detection sensor, the control section lifts the suspension and executes the print job based on the print job command.

* * * * *